US005578209A

United States Patent [19]
Weiss

[11] Patent Number: 5,578,209
[45] Date of Patent: Nov. 26, 1996

[54] CENTRIFUGAL FLUID SEPARATION DEVICE

[75] Inventor: Brian D. Weiss, Kailua-Kona, Hi.

[73] Assignee: Weiss Enterprises, Inc., Kailua-Kona, Hi.

[21] Appl. No.: 310,143

[22] Filed: Sep. 21, 1994

[51] Int. Cl.$^6$ ...................................................... B01D 21/26
[52] U.S. Cl. ...................... 210/512.1; 210/295; 209/715; 209/725; 209/731; 55/459.1
[58] Field of Search ............................ 210/512.1, 221.2, 210/295; 209/715, 725, 731; 55/459.1

[56] References Cited

U.S. PATENT DOCUMENTS

| | | |
|---|---|---|
| 2,364,799 | 3/1941 | Laughlin et al. . |
| 2,719,631 | 2/1952 | Vicard . |
| 3,954,611 | 5/1976 | Reedy ..................................... 210/295 |
| 3,985,522 | 10/1976 | Kuhlmann . |
| 4,343,707 | 8/1982 | Lucas .................................. 210/512.1 |
| 4,652,363 | 3/1987 | Miller .................................. 210/512.1 |
| 4,678,588 | 7/1987 | Shortt .................................... 210/788 |
| 4,708,801 | 11/1987 | Galaj ....................................... 210/636 |
| 4,857,197 | 8/1989 | Young et al. ........................ 210/512.1 |
| 5,004,552 | 4/1991 | Al-Yazdi ................................. 210/789 |
| 5,093,006 | 3/1992 | Kalnins ................................ 210/512.1 |
| 5,104,520 | 4/1992 | Maronde et al. ....................... 209/144 |
| 5,131,544 | 7/1992 | Serres et al. ........................ 210/512.1 |

OTHER PUBLICATIONS

International Search Report dated Dec. 20, 1995, PCT/US95/11559.
A.M.L. Industries, Inc., Lavin Centrifuge, "Liquid/Liquid Separator".
Two pages on Cyclomite cyclone separator.
Pp. 2916–1 through 2916–4 from "Quality Solids Separation Co.".
Pp. 67–72, Chemical Engineering Progress (vol. 69, No. 9), entitled: "Centrifuges: The Hydrocyclone in Process and Pollution Control". Sep. 1973.
Four pages, Thomas Register 1992.
Three pages, Continental Penfield Water Systems.
Pp. 758–763, Centrifugation.
One page from Science News, Jul. 21, 1990 (vol. 138, No. 3).
One page, NASA Tech Brief, Dec. 1988.
One page 2–8, Ingersoll–Rand Cameron Hydraulic Data.
One page, Connecticut Hypodermics Inc. on "Medical Grade Stainless Steel Tubing Dimensions".
One page, Resonetics Micromachining Solutions on "Core Capabilities".
Three pages, Swiss Jewel Company, "Synthetic Sapphire & Ruby Precision Jewel Bearings & Specialities".
Pp. 715–743, "The Theory of Sedimentation Analysis".

Primary Examiner—David A. Reifsnyder
Attorney, Agent, or Firm—Baker & Botts L.L.P.

[57] ABSTRACT

A fluid separation device (20) is provided for separating a raw fluid (51) into a plurality of components (36, 37 and 38). A body (21) has a cylindrical bore (39) defined by an inner wall (41) of the body (21). A generally solid cylindrical core (22) has a helical channel (46) formed in a periphery of the cylindrical core (22). The helical channel (46) has a generally rectangular cross-section. The cylindrical core (22) is disposed in the cylindrical bore (39) such that the inner wall (41) of the body (21) and the helical channel (46) form a helical coil (24). A feeder assembly (23) is in fluid communication with the helical coil (24), such that the feeder assembly (23) is operable to transport a raw fluid (51) to the helical coil (24). A splitter assembly (25) is also in fluid communication with the helical coil (24 ). The splitter assembly (25) comprises at least one separator vane (31) defining a plurality of conduits. The splitter assembly (25) is operable to separate a radially stratified fluid (35) flowing from the helical coil (24) into a plurality of components (36, 37 and 38) by directing each component into one of the plurality of conduits.

27 Claims, 5 Drawing Sheets

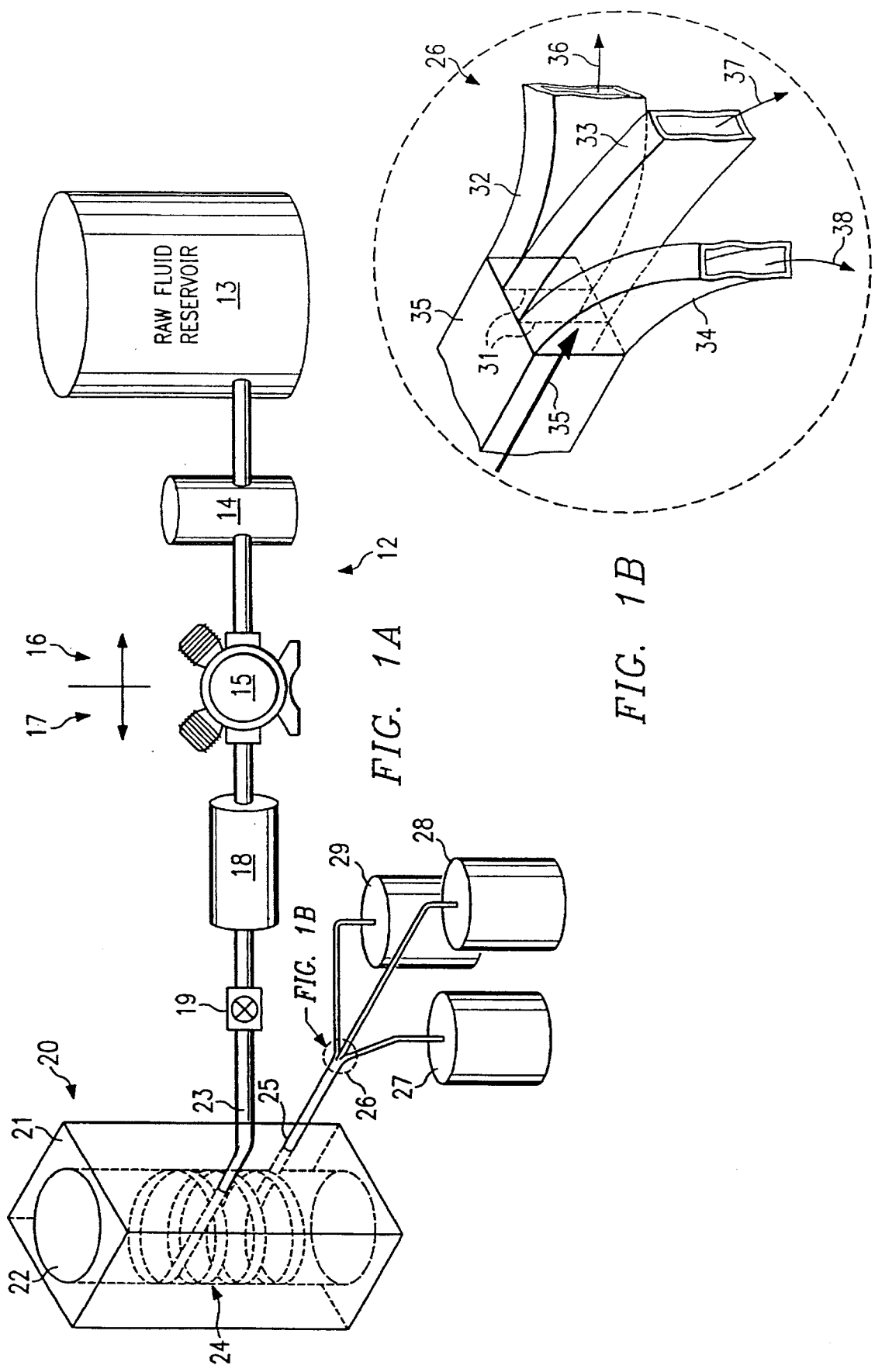

CENTRIFUGAL FLUID SEPARATION DEVICE

TECHNICAL FIELD OF THE INVENTION

This invention relates in general to the field of centrifugation, and more particularly to a fluid separation device, system and method of construction.

BACKGROUND OF THE INVENTION

Centrifugation involves the use of mechanical methods to separate liquids and solids by the application of centrifugal force. Separations that proceed slowly under the force of gravity can be speeded enormously through the use of centrifugation equipment to produce centrifugal forces much larger than the force of gravity. Centrifuges are one type of commonly used centrifugation equipment. Conventional laboratory centrifuges are used for testing and research. Conventional industrial centrifuges are used in diverse areas such as sugar refining, oil and gas drilling and production, chemical manufacture, de-watering diesel and jet fuel, and municipal waste treatment.

A force must be applied acting inward toward the center of rotation to make an object move in a circular path. Otherwise the object would continue on a straight path. The object experiences centrifugal acceleration commonly conceptualized as a centrifugal force that acts in an outward direction on the rotating object. The magnitude of the centrifugal force exerted on the object depends on the object's angular velocity and distance from the center of rotation. Centrifugal acceleration is usually compared with gravitational acceleration at the earth's surface. Consequently, centrifugal force is often expressed as a relative force representing multiples of the force of gravity.

Relative centrifugal force can be calculated according to the following equation, $$F_R = (5.59 \times 10^{-4}) n^2 D = \frac{0.204 V^2}{D}$$

where D is the diameter of the circular path, in meters; n is the rotational speed, in revolutions per minute (rpm's); and V is the peripheral speed of the object around the center of rotation, in meters per second. In a conventional centrifuge, the force varies radially from zero at the rotational axis to a maximum where D equals the inside diameter of the bowl or chamber.

A cyclone is one type of conventional centrifugation equipment that is stationary. Centrifugal force can be generated inside stationary equipment by introducing a high velocity fluid stream tangentially into a cylindrical, conical chamber forming a vortex. Cyclone separators based on this principal remove liquid drops or solid particles from gases. Smaller devices, called liquid cyclones, separate solid particles from liquids. The high velocity required at the inlet of a liquid cyclone can be obtained with standard pumps. Cyclones with diameters ranging from 100 to 300 millimeters make crude separations of large, relatively heavy, solid particles from liquids. The pressure drop across such cyclones can be about 30 to 60 pounds per square inch (psi). More difficult separations may be accomplished by using banks of small devices called hydroclones. Each hydroclone can be approximately 10 millimeters in diameter, can concentrate or remove small particles and can have a pressure drop of approximately 100 psi.

Other conventional stationary centrifugation devices utilize a helical flow path to separate solids and liquids from flowing liquid mixtures. One example of such a system is disclosed in U.S. Pat. No. 4,343,707. The apparatus disclosed in this patent uses a helical conduit to direct water and suspended solids in a helical flowpath, subjecting the water and solids to centrifugal force. This apparatus also uses magnets mounted around the helical conduit to subject the solids suspended in the water to a magnetic force. This magnetic force and the centrifugal force direct the suspended solids radially outward as the water flows through the helical conduit. This apparatus is a low pressure device and requires the magnets to accomplish the desired separation. The water is split into two outlet nozzles such that water with the suspended solids exits the outer nozzle. The remaining water with the suspended solids removed exits the inward nozzle.

An additional centrifugation device using a helical flowpath is disclosed in U.S. Pat. No. 5,004,552. The apparatus disclosed in this patent separates water and crude oil mixtures and other two-phase mixtures having components of different densities. The mixture is pumped through a conduit in the form of a vertical spiral impelling the heavy phase toward the outside of the spiral. A fraction is withdrawn from the outside of the turns of the spiral and is led downwardly to the bottom of a vertical settling tank. Any light phase removed with the heavy phase floats to the top in the settling tank and is reinduced at the top of the spiral.

U.S. Pat. No. 4,678,558 discloses a further apparatus that uses a helical conduit. This apparatus comprises a helical conduit for constraining a fluid flow established along a closed helical tubular course. The helical tubular course has an inlet and outlet respectively situated at opposite ends. A peripheral outlet is disposed at an outer periphery of the conduit between the inlet and outlet ends. The peripheral outlet is used to remove a peripheral fraction concentrated by centrifugal forces in the outer or inner periphery. An unremoved fraction of the flow is allowed to continue along the helical course to the terminal outlet.

Each apparatus disclosed in the above-described patents, as well as other conventional stationary centrifugation equipment, suffer from several problems. Although helpful for separating materials having large density differentials, these conventional devices are unable to accomplish more difficult separations. This inability is caused by a limit as to the multiples of gravity that can be produced. For example, at higher velocities, cyclones experience turbulence that reduces the cyclones' ability to separate. Conventional stationary centrifugation systems are unable to handle fluids having velocities high enough to generate the large centrifugal forces.

SUMMARY OF THE INVENTION

In accordance with the present invention, a fluid separation device, system and method of operations are provided that substantially eliminates or reduces disadvantages and problems associated with previously developed centrifugation equipment.

According to one embodiment of the present invention, a fluid separation device is provided for separating a raw fluid into a plurality of components. A body has a cylindrical bore defined by an inner wall of the body. A generally solid cylindrical core has a helical channel formed in a periphery of the cylindrical core. The cylindrical core is disposed in the cylindrical bore such that the inner wall of the body and the helical channel form a helical coil. The helical coil has an inlet and an outlet and has, a generally rectangular cross-section. A feeder assembly is disposed in the body. The feeder assembly is in fluid communication with the inlet of the helical coil, such that the feeder assembly is operable to transport a raw fluid to the inlet of the helical coil. A splitter assembly also is disposed in the body. The splitter assembly is in fluid communication with the outlet of the helical coil. The splitter assembly comprises at least one separator vane defining a plurality of conduits. The splitter assembly is operable to separate a radially stratified fluid flowing from the outlet of the helical coil into a plurality of components by directing each component into one of the plurality of conduits.

One technical advantage of the present invention is an ability to process raw fluid at high velocities producing large centrifugal forces in a stationary centrifugation device. These large centrifugal forces are beneficial to fluid separation in a host of industrial processes, including oil and gas refining, waste separation, water cleansing and desalinization, and pharmaceutical, medical and chemical production.

Another technical advantage of the present invention is continuous processing of raw fluids. Raw fluids introduced into a fluid separation device of the present invention move at high velocities through a helical coil. There is no buildup of material within the helical coil and there can be completely continuous processing of raw fluids with no need for batch operation.

A further technical advantage of the present is the use of hard, temperature and friction resistant materials for constructing the body and the core of a fluid separation device according to the teachings of the present invention. These materials include synthetic sapphire and alumina ceramic. These materials can withstand high pressures, high temperatures and continuous friction from fluid mixtures containing coarse abrasives.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein:

FIG. 1A is a schematic illustration of a fluid separation system utilizing a fluid separation device constructed according to the teachings of the present invention;

FIG. 1B is an enlarged drawing with portions broken away of the junction at the exit end of the splitter assembly of FIG. 1;

DETAILED DESCRIPTION OF THE INVENTION

Figure 2A:
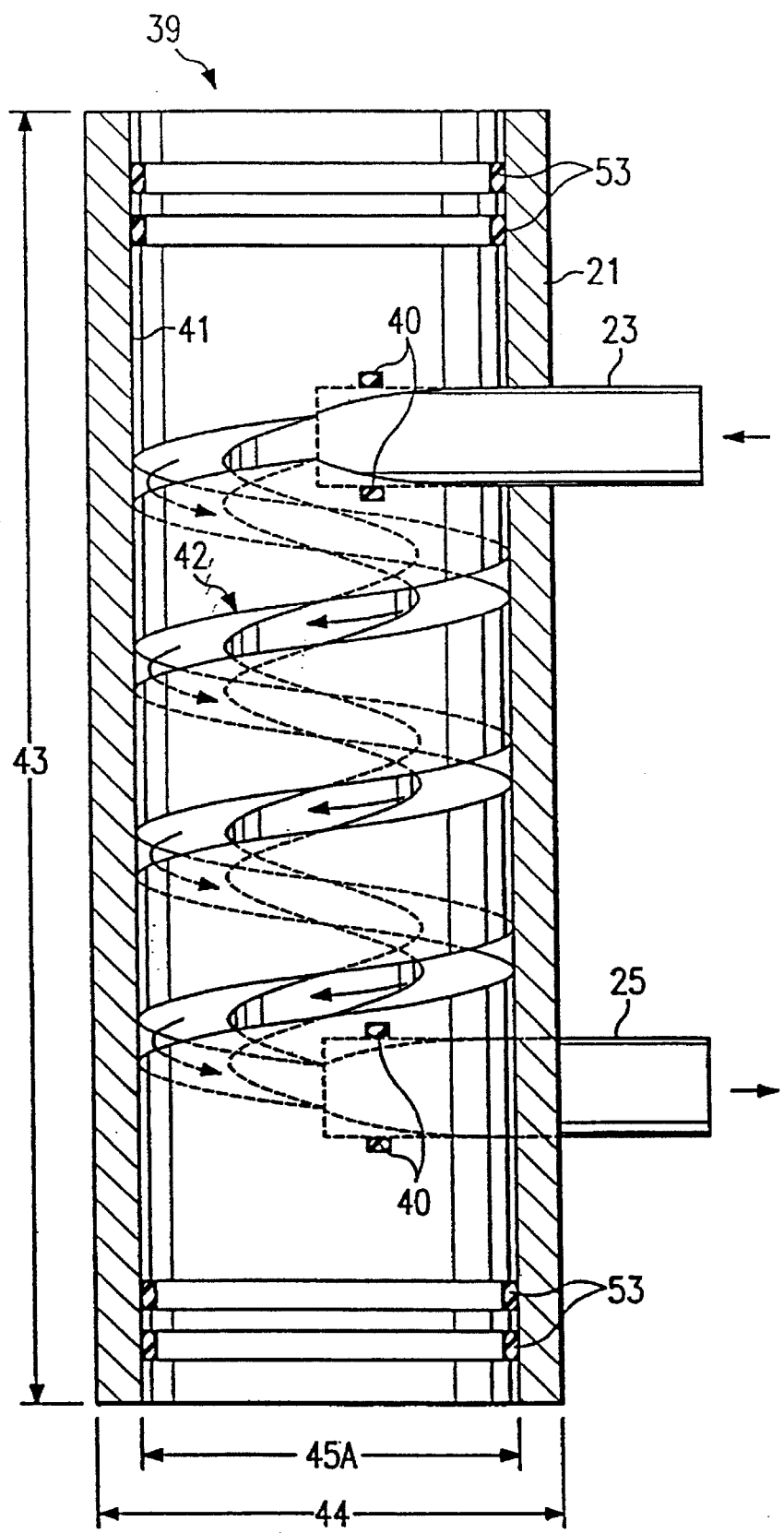
FIG. 2A is a drawing in section with portions broken away of one embodiment of a body of a fluid separation device constructed according to the teachings of the present invention.

The present invention and its advantages are best understood by referring to the drawings, like numerals being used to refer to like and corresponding parts.

Fluid Separation System

FIG. 1A is a schematic drawing of a fluid separation system, indicated generally at 12, for separating raw fluid into separate component fluids. Fluid separation system 12 includes a raw fluid reservoir 13 having an outlet. A pre-filter system 14 has an inlet and an outlet. The inlet of pre-filter system 14 is coupled in fluid communication with the outlet of raw fluid reservoir 13.

A pump 15 has an inlet and an outlet. Pump 15 creates a low pressure side 16 and a high pressure side 17 of fluid separation system 12. The inlet of pump 15 is coupled in fluid communication with the outlet of pre-filter system 14. Pump 15 comprises a conventional pump operable to generate low pressure side 16 and high pressure side 17. A post-filter system 18 has an inlet and an outlet. The inlet of post-filter system 18 is coupled in fluid communication with the outlet of pump 15. A sensor valve 19 has an inlet and an outlet. The inlet of sensor valve 19 is coupled in fluid communication with the outlet of post-filter system 18. For some applications, raw fluid reservoir 13 may be an under, round hydrocarbon-producing reservoir.

A fluid separation device, indicated generally at 20, comprises a body 21 and a cylindrical core 22. As illustrated in FIG. 1A, fluid separation device 20 is not necessarily in scale with the other elements. One important feature of the present invention includes the ability to vary the size of fluid separation device 20 depending upon the specific operating conditions while maintaining the desired separation of raw fluid associated with the present invention.

A feeder assembly 23 is coupled in fluid communication to the outlet of sensor valve 19 and extends through body 21. A helical coil 24 formed by body 21 and cylindrical core 22 has an inlet aligned with feeder assembly 23. Helical coil 24 is coupled in fluid communication with feeder assembly 23. Helical coil 24 has an outlet aligned with a splitter assembly 25.

Splitter assembly 25 extends through body 21 and is coupled in fluid communication with helical coil 24. Splitter assembly 25, as shown, separates fluid exiting helical coil 24 into three conduits. Splitter assembly 25 has an exit end at junction 26 as described in more detail with respect to FIG. 1B.

A first component reservoir 27 has an inlet. The inlet of component reservoir 27 is coupled in fluid communication with splitter assembly 25. A second component reservoir 28 has an inlet coupled in fluid communication with splitter assembly 25. A third component reservoir 29 also has an inlet. The inlet of component reservoir 29 is coupled in fluid communication with splitter assembly 25. Component reservoir 27, component reservoir 28, and component reservoir 29 receive the components' fluids separated by splitter assembly 25, as shown.

FIG. 1B is an enlarged drawing with portions broken away of Junction 26 of FIG. 1A. Splitter assembly 25 includes two separator vanes 31 that define, in part, three conduits within splitter assembly 25. A pipe 32 is coupled in fluid communication with the radially outermost conduit defined by separator vanes 31. A second pipe 33 is coupled in fluid communication with the middle conduit defined by separator vanes 31, rand a third pipe 34 is coupled in fluid communication with the radially innermost conduit defined by separator vanes or splitter van 31.

A stratified fluid 35 flowing from helical coil 24 and through splitter assembly 25 is separated into components by separator vanes 31. Three portions or components of stratified fluid 35 are directed into separate conduits by separator vanes 31. A first component 36 is directed through pipe 32. A second component 37 is directed through pipe 33, and a third component 38 is directed through pipe 34. Component 36 is carried to and stored in component reservoir 29. Component 37 is carried to and stored in component reservoir 28, and component 38 is carried to and stored in component reservoir 27.

In operation, raw fluid reservoir 13 may hold a volume of raw fluid. In one embodiment of the present invention, raw fluid reservoir 13 can be filled with raw fluid in a conventional manner. Raw fluid reservoir 13 may also comprise an underground hydrocarbon-producing reservoir. Fluid separation system 12 separates the raw fluid into component 36, component 37 and component 38 stored in component reservoir 29, component reservoir 28 and component reservoir 27, respectively. The raw fluid may comprise fluids produced by oil and gas wells, petroleum refining fluids, waste and sewage, salt water, pharmaceutical and medical solutions, chemical solutions and mixtures and various other gases, liquids, solutions and mixtures having components of varying weight or density.

Pump 15 receives raw fluid from raw fluid reservoir 13 through pre-filter system 14. Pre-filter system 14 operates to remove large particles such as sludge and small animals from the raw fluid. Pump 15 then provides pressurized raw fluid for separation into components to high pressure side 17 of fluid separation system 12.

Post-filter system 18 filters the pressurized raw fluid to remove particles that may damage valves or fluid separation device 20. Sensor valve 19 controls and monitors the flow of pressurized raw fluid from post-filter system 18 to fluid separation device 20. Depending upon the specific operating conditions and the type of fluid being separated, pre-filter system 14 and post-filter system 18 may be eliminated from fluid separation system 12.

Fluid separation device 20 operates to stratify the pressurized raw fluid into a stratified fluid by subjecting the raw fluid to large centrifugal forces. The pressurized raw fluid flows at relatively high velocities through helical coil 24 experiencing a large pressure gradient between feeder assembly 23 and splitter assembly 25. The components of the stratified fluid are disposed radially with respect to helical coil 24.

As the raw fluid flows through helical coil 24, the raw fluid experiences large centrifugal forces. The multiples of gravity of centrifugal force experienced by the raw fluid is given by the following formula:

$$F_R = \frac{.204 V^2}{D}$$

where $F_R$ is the multiples of the earth's gravity produced, $V$ is the velocity of the raw fluid flow in meters per second, and $D$ is the diameter of helical coil 24. There is, of course, some pressure differential across the interior of the helical coil 24 as with any centrifugation system due to the range of diameter. Fluid separation device 20 is described in more detail with respect to FIGS. 2A, 2B and 2C.

The stratified fluid exiting helical coil 24 is separated into components by splitter assembly 25. Splitter assembly 25 includes separator vanes 31 that define, in part, three conduits as shown in FIG. 1B. Splitter assembly 25 separates the radially stratified fluid 35 flowing from helical coil 24 by directing each component into one of the conduits defined by separator vanes 31. For the illustrated embodiment, stratified fluid 35 is separated into component 36, component 37 and component 38. In another embodiment of the present invention, component 37 may be returned to raw fluid reservoir 13 to be recycled through helical coil 24 for recursively processing the raw fluid. In the illustrated embodiment, component 36, component 37 and component 38 are transported to and stored in component reservoir 29, component reservoir 28 and component reservoir 27, respectively.

Fluid separation system 12 processes raw fluid to separate the raw fluid into three components. Component 36 comprises heavier material in the raw fluid that moves to the outside of helical coil 24 under the influence of the centrifugal force generated as the raw fluid flows through helical coil 24. Component 38 comprises the lighter material in the raw fluid that moves to the inside of helical coil 24, and component 37 comprises the remaining material that moves to the middle of helical coil 24. The raw fluid is radially stratified by the centrifugal force the raw fluid experiences flowing through helical coil 24. The magnitude of the centrifugal force is dependent upon the velocity of the fluid through helical coil 24 and the diameter of helical coil 24, as described above. The length, the cross-section and the diameter of helical coil 24 can be set as appropriate for a desired application. Generally, the diameter and the cross-section of helical coil 24 can be larger when the material to be separated is heavier.

Alternate embodiments of the present invention having a fluid separation device constructed according to the teachings of the present invention may be used for oil and gas industry applications. Alternate embodiments of the present invention may be used in refining the product, treating gaseous wastes, and treating liquid wastes. Of course, many other applications are possible, and the embodiments discussed herein are for purposes of description and should not be construed to limit the scope of the present invention.

A fluid separation system, constructed according to the teachings of the present invention, can be used to replace the natural gas fractionalization process by which raw product is processed to produce propane, butane and natural gas. The raw natural gas product can be forced through the helical coil of the fluid separation device at high velocities to stratify the raw product into propane, butane and natural gas. The splitter assembly then separates the propane product, butane product and natural gas product. These components are collected in separate component reservoirs.

Another embodiment of the present invention utilizes a fluid separation system constructed according to the teachings of the present invention to replace conventional gaseous waste treatment. The conventional tail gas cleanup process requires wet scrubbing and dry bed processes. According to the teachings of the present invention, tail gas can be forced through the helical coil of a fluid separation device to stratify the tail gas into lightest gas, heavier gas and heaviest gas product. These products are then collected in separate component reservoirs.

A third embodiment of the present invention uses a fluid separation system constructed according to the teachings of the present invention to replace conventional liquid waste treatment. In conventional treatment, foul oily waters are fed through an elaborate system to produce treated effluent. A two-stage fluid separation system constructed according to the teachings of the present invention can be used first to separate foul, oily waters into relatively pure water and contaminated oil. The contaminated oil can then be fed through a second stage fluid separation device to separate the contaminated oil into gas, oil and residual solids.

Fluid Separation Device

Figure 2B:
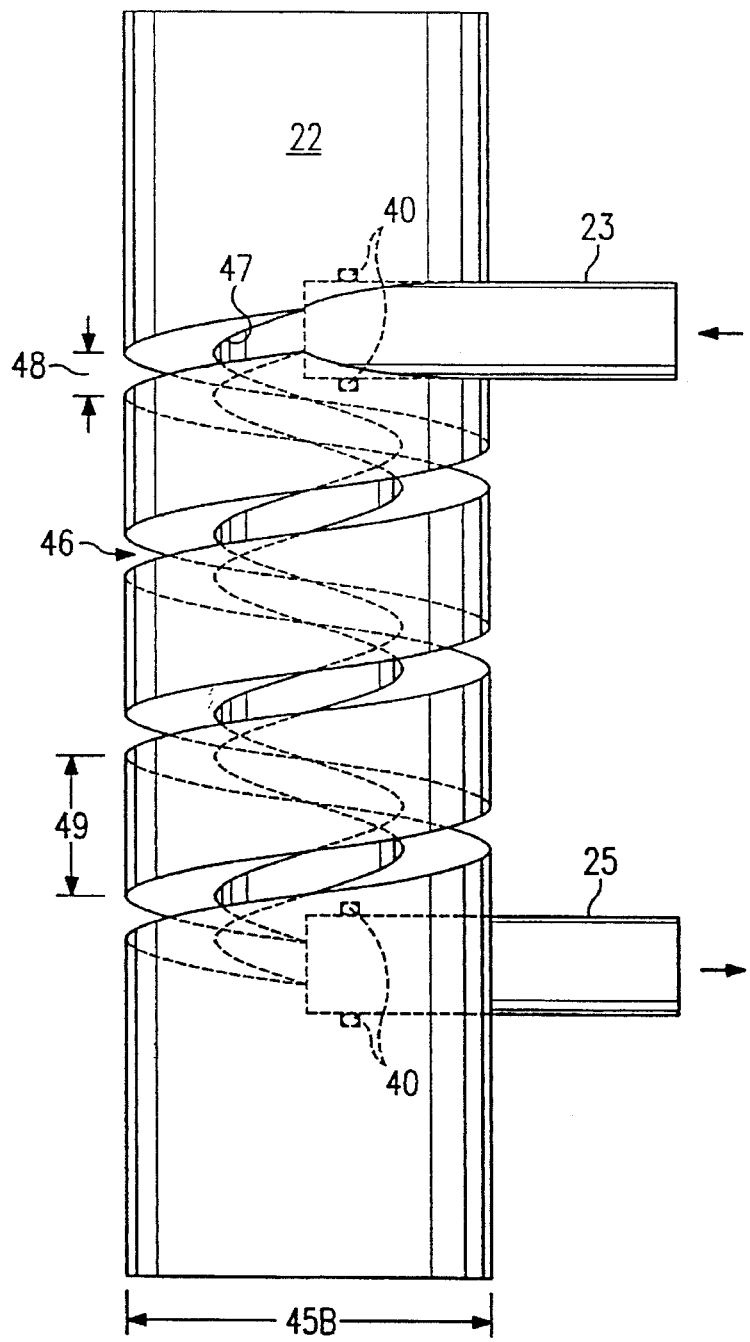
FIG. 2B is a drawing in elevation with portions broken away of a cylindrical core of a fluid separation device constructed according to the teachings of the present invention.
Figure 2C:
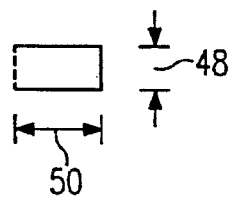
FIG. 2C is a cross-sectional view of the helical channel of the cylindrical core of FIG. 2B.

FIGS. 2A, 2B and 2C illustrate in more detail fluid separation device 20 of FIG. 1A. FIG. 2A is a drawing in section with portions broken away of body 21 of fluid separation device 20. Body 21 preferably includes a generally cylindrical bore 39 extending the length of body 21. A number of elastomer seals 40 cooperate with sealing surfaces in cylindrical bore 39 to form fluid barriers for feeder assembly 23 and for splitter assembly 25.

An inner wall 41 of body 21 defines the periphery of cylindrical bore 39. Inner wall 41 also forms the radially outermost boundary of helical coil 24 in fluid separation device 20. The flow path, indicated generally at 42, for fluid flowing through fluid separation device 20 is a helical path from feeder assembly 23 to splitter assembly 25.

Flow path 42 is defined in part by cylindrical core 22 of fluid separation device 20 as described in more detail with respect to FIG. 2B. Cylindrical core 22 can be disposed in cylindrical bore 39, and elastomer seals 53 are disposed between body 21 and cylindrical core 22 to provide sealing surfaces. Feeder assembly 23 and splitter assembly 25 extend through body 21 and are aligned with flow path 42, as shown.

In the illustrated embodiment of the present invention, body 21 is a generally rectangular prism with a square cross-section. Body 21 has a length 43 and a width 44. Each side of body 21 is equal to width 44. Cylindrical bore 39 has a diameter 45A. An important feature of the present invention includes the ability to vary the external configuration of body 11 as desired for each application while maintaining the same cylindrical bore 39.

FIG. 2B is a drawing in elevation with portions broken away of generally solid cylindrical core 22 of fluid separation device 20. Cylindrical core 22 has a generally cylindrically shaped and a diameter 45B that is approximately equal to diameter 45A of cylindrical bore 39 of body 21. A helical channel, indicated generally at 46, is formed in the periphery of cylindrical core 22. Helical channel 46 has an helical surface 47 and a width 48. Each turn of helical channel 46 is separated by a length 49. When cylindrical core 22 is disposed in cylindrical bore 39, inner wall 41 of body 21 and helical channel 46 form helical coil 24. Cylindrical core 22 can be retained in cylindrical bore 39 by conventional attachment means, not shown in FIG. 2B. As shown, feeder assembly 23 and splitter assembly 25 are coupled in fluid communication with helical channel 46.

FIG. 2C is a cross-sectional view of helical channel 46. Helical channel 46 has a width 48 and a length 50. Helical channel 46 may have a rectangular cross-section, as shown.

According to the teachings of the present invention, fluid separation device 20 is constructed by disposing cylindrical core 22 in cylindrical bore 39 of body 21. Both body 21 and cylindrical core 22 are constructed from hard, temperature resistant materials capable of withstanding high pressures and continuous friction from raw fluid flowing at high velocity through helical core 24. In one embodiment of the present invention, body 21 and cylindrical core 22 may be constructed from synthetic sapphire. Other types of synthetic gemstones and alumina ceramic as well as other hard, smooth materials may also be used for constructing fluid separation device 20.

Synthetic sapphire is well suited for constructing fluid separation device 20 for many reasons including resistance to acids at room temperature, although some etching occurs with boiling phosphoric acid. Synthetic sapphire generally is not affected by exposure to atmospheric phenomenon, including industrial pollution. Synthetic sapphire also is unaffected by salt water and resists the growth of salt water algae. Further, synthetic sapphire is not affected by bodily fluids. Synthetic sapphire is dense, resistant to large tensile and compressive forces, and is very rigid. The coefficient of friction of synthetic sapphire is very low. Synthetic sapphire has a melting point of over 2,000° C. with a maximum operating temperature at approximately 2,000° C. These characteristics of synthetic sapphire coupled with economical manufacturing costs make synthetic sapphire useful for constructing body 21 and cylindrical core 22 of fluid separation device 20.

Figure 3:
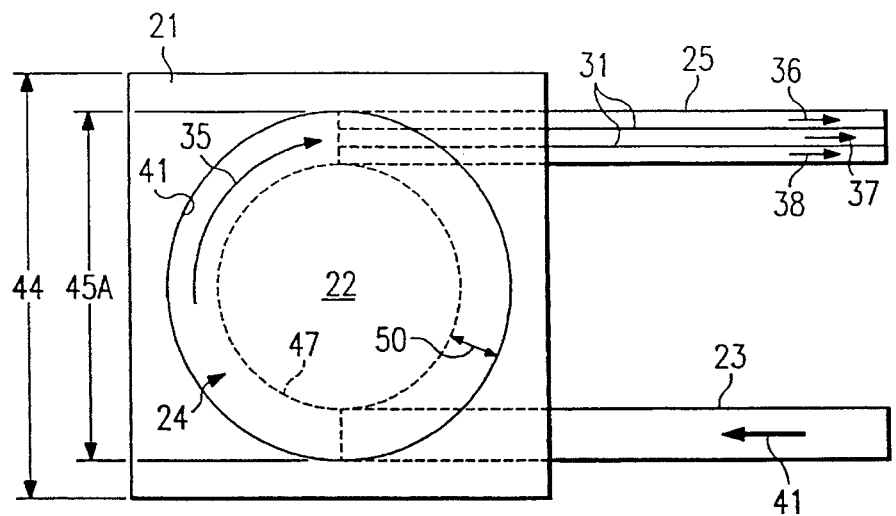
FIG. 3 is a top view of a fluid separation device constructed according to the teachings of the present invention.

FIG. 3 is a top view of fluid separation device 20 of FIG. 1A. As shown, feeder assembly 23 extends through body 21 and is in fluid communication with helical coil 24. Similarly, splitter assembly 25 extends through body 21 and is in fluid communication with helical coil 24. Body 21 has a width 44 on each side. Cylindrical bore 39 has a diameter 45A and is defined by inner wall 41 of body 21. Cylindrical core 22 defines helical surface 47 of helical coil 24 as described above with respect to FIG. 2B. Helical coil 24 has a cross-sectional length 50 as described above with respect to FIG. 2C.

Raw fluid 51 flows under high pressure through feeder assembly 23 to helical coil 24. Upon entering helical coil 24, raw fluid 51 flows through helical coil 24 at high velocity due to a large pressure gradient between feeder assembly 23 and splitter assembly 25. Raw fluid 51 experiences large centrifugal forces depending upon the velocity of flow, diameter 45A of helical coil 24 and cross-sectional length 50.

Passing through helical coil 24 stratifies raw fluid 51 into stratified fluid 35. Stratified fluid 35 includes radially layered components. Heavier portions of raw fluid 51 will move radially outward under the centrifugal force produced as raw fluid 51 flows through helical coil 24. Lighter portions of raw fluid 51 will move radially inward as raw fluid 51 flows through helical coil 24. Stratified fluid 35 may be separated by separator vanes 31 of splitter assembly 25 into components by directing each component into a separate conduit. Splitter assembly 25 can be modified in accordance with the teachings of the present invention to separate stratified fluid 35 into two or more components. In the illustrated embodiment, stratified fluid 35 is separated into first component 36, second component 37 and third component 38. As described in more detail with respect to FIGS. 1A and 1B, components 36, 37 and 38 are carried to separate component reservoirs by separate pipes in fluid communication with splitter assembly 25.

Splitter Assemblies

Figure 4A:
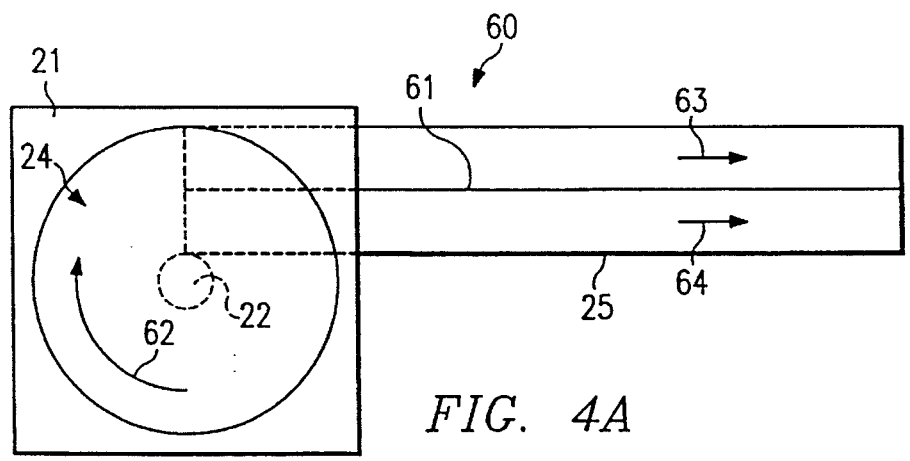
FIGS. 4A, 4B, 4C and 4D are schematic illustrations showing different embodiments of a splitter assembly for a fluid separation device constructed according to the teachings of the present invention.

FIGS. 4A, 4B, 4C and 4D are schematic illustrations showing alternate embodiments of a splitter assembly for separating a stratified fluid into separate components. FIG. 4A is a top view of one embodiment of a splitter assembly, indicated generally at 60. Splitter assembly 60 comprises one splitter vane 61 operable to separate stratified fluid 62 into a first component 63 and a second component 64. First component 63 will include heavier portions of stratified fluid 62, and second component 64 will include lighter portions of stratified fluid 62.

Figure 4B:
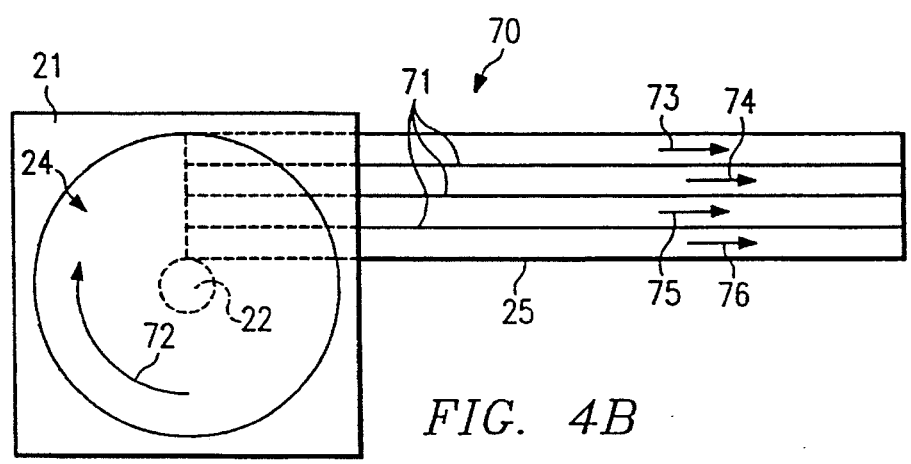

FIG. 4B is a top view of another embodiment of a splitter assembly, indicated generally at 70. Splitter assembly 70 comprises three splitter vanes 71 operable to separate stratified fluid 72 into four components. A first component 73, a second component 74, a third component 75 and a fourth component 76 are directed into separate conduits as shown. The number of splitter vanes chosen for a splitter assembly can be selected as appropriate for a desired application. In addition, although splitter vanes 71 are illustrated as evenly spaced across splitter assembly 70, splitter vanes 71 could be staggered as desired to separate stratified fluid 72.

Figure 4C:
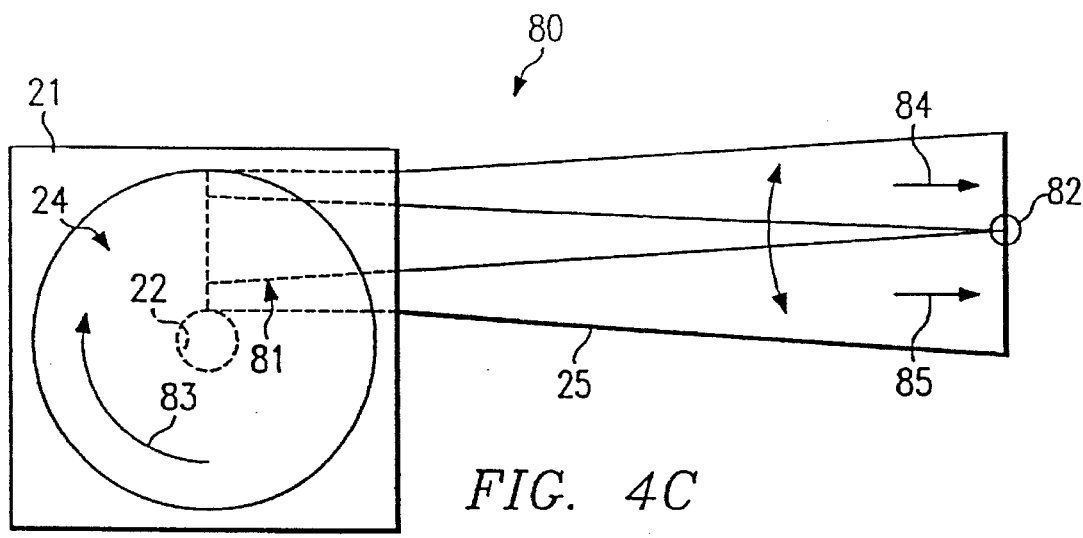

FIG. 4C is a top view of a third embodiment of a splitter assembly, indicated generally at 80. Splitter assembly 80 has a movable separator vane 81. Separator vane 81 is movably coupled at 82 to allow radial movement of splitter vane 81. Separator vane 81 can be set with respect to helical coil 24 to vary component separation. In one embodiment of the present invention, placement of separator vane 81 is controlled manually. In a further embodiment of the present invention, placement of separator vane 81 is controlled automatically by a sensor placed prior to feeder assembly 23. As shown in FIG. 4C, a stratified fluid 83 is separated into a first component 84 and a second component 85 by separator vane 81. Separator vane 81 is moveable to change the composition of component 84 and component 85. For other applications, one or more sensors may be placed in the outlet from splitter assembly 70 to control the positions of splitter vanes 71.

Figure 4D:
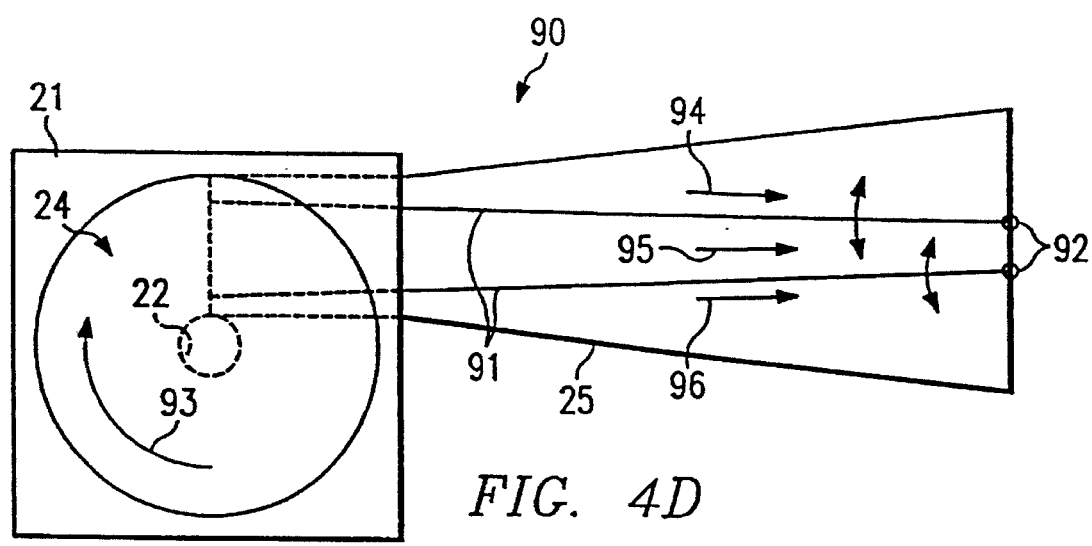

FIG. 4D is a top view of a further embodiment of a splitter assembly, indicated generally at 90. Splitter assembly 90 includes two movable splitter vanes 91. Each splitter vane 91 is movably coupled at 92, and is movable radially within helical coil 24. Splitter vanes 91 separate stratified fluid 93 into component 94, component 95 and component 96. The composition of component 94, component 95 and component 96 can be varied by varying the placement of splitter vanes 91. The placement of splitter vanes 91 can be controlled manually or automatically, as described above.

Centrifugal Force

A fluid separation system utilizing a fluid separation device constructed according to the teachings of the present invention operates to process raw fluid under large centrifugal forces. The centrifugal force produced by a fluid separation device constructed according to the teachings of the present invention can be greatly in excess of forces produced by conventional centrifugation equipment.

The following is an example calculation to illustrate the centrifugal forces generated by a fluid separation device constructed according to the teachings of the present invention. A raw fluid under pressure of 5,000 psi flowing through a pipe having a diameter of 0.5 inches cam be directed through the fluid separation device. Head feet can be calculated by the following formula:

HeadFeet=psi×2.31

Further, the gallons per minute can be calculated by the following formula:

GPM=19.636×(aperture in inches)$^2$×(squareroot of head feet)

For this example, the raw fluid is flowing at approximately 528 gallons per minute or 8.79 gallons per second. This flow can be converted to cubic centimeters per second, which in this case is approximately 33,300 cubic centimeters per second.

Utilizing the rate of fluid flow, the velocity of the raw fluid in meters per second through the helical coil of the fluid separation device can be determined. For a given cross-sectional area of the helical coil, the raw fluid will flow at a given velocity. For this example, assume the cross-sectional area of the helical coil is two square centimeters. Consequently, the fluid is flowing at 16,600 centimeters per second or 166 meters per second.

The multiples of gravity of centrifugal force experienced by the raw fluid can be calculated according to the following equation, as described above:

$$F_R = \frac{0.204V^2}{D}$$

In this example, the multiples of gravity produced is approximately equal to $$\frac{5,621}{D}.$$

If the diameter of the helical coil were five centimeters or 0.05 meters, a centrifugal force equal to approximately 112,420 times the gravitational force of the earth would be generated.

The horsepower required to create the pressure of 5000 psi if natural pressure were not available, is given by the following equation:

$$\text{Horsepower required} = \frac{GPM \times \text{psi}}{1416}$$

In this case, the horsepower required is approximately 1,807 hp.

Summary and Overview

A fluid separation system using a fluid separation device constructed according to the teachings of the present invention processes raw fluid to separate the raw fluid into a plurality of components. The raw fluid is stratified by large centrifugal forces generated as the raw fluid flows through the helical coil of the fluid separation device. The components of the raw fluid are then separated by a splitter assembly coupled to the helical coil.

A technical advantage of the present invention is an ability to process raw fluid at high velocities producing large centrifugal forces in a stationary centrifugation device. These large centrifugal forces are beneficial to fluid separation in a-host of industrial processes, including oil and gas refining, waste separation, water cleansing and desalinization, and pharmaceutical, medical other chemical production.

Another technical advantage of the present invention is continuous processing of raw fluids. Raw fluids introduced into a fluid separation device of the present invention moves at high velocities through a helical coil. There is no buildup of material within the helical coil and there can be completely continuous processing of raw fluids with no need for batch operation.

A further technical advantage of the present is the use of hard, temperature and friction resistant materials for constructing the body and the core of a fluid separation device constructed according to the teachings of the present invention. These materials include synthetic sapphire and alumina ceramic. These materials can withstand high pressures high temperatures and continuous friction from fluid mixtures containing coarse abrasives.

Although the present invention has been described in detail, it should be understood that various changes, substitutions and alterations can be made hereto without departing from the spirit and scope of the invention as defined by the independent claims.

What is claimed is:

1. A fluid separation device for separating a raw fluid into a plurality of components, comprising:
    a body having a generally cylindrical bore with an inside diameter and an inner wall defined in part by the inside diameter of the cylindrical bore of the body;
    a generally cylindrical core having an outside diameter which defines in part a periphery of the generally cylindrical core;
    the inside diameter of the generally cylindrical bore approximately equal to the outside diameter of the generally cylindrical core;
    a helical channel formed in the periphery of the cylindrical core;
    the cylindrical core disposed in the cylindrical bore such that the inner wall of the body and the helical channel cooperate with each other to form a helical coil;
    the helical coil having an inlet and an outlet and a generally rectangular cross-section;
    a feeder assembly disposed in the body and in fluid communication with the inlet of the helical coil, such that the feeder assembly is operable to transport the raw fluid to the inlet of the helical coil; and
    a splitter assembly disposed in the body and in fluid communication with the outlet of the helical coil, wherein the splitter assembly comprises at least one separator vane defining, in part, a plurality of conduits, such that the splitter assembly is operable to separate a radially stratified fluid flowing from the outlet of the helical coil into a plurality of components by directing each component into one of the plurality of conduits, respectively.

2. The fluid separation device of claim 1, further comprising the body and the generally cylindrical core constructed from synthetic sapphire.

3. The fluid separation device of claim 1, further comprising the body and the generally cylindrical core constructed from alumina ceramic.

4. The fluid separation device of claim 1, wherein the raw fluid comprises hydrocarbons produced from an underground reservoir and the splitter assembly providing means for separating radially stratified hydrocarbons flowing from the outlet of the helical coil into a propane component, a butane component and a natural gas component.

5. The fluid separation device of claim 1, wherein the raw fluid comprises tail gas from a refining process and the splitter assembly providing means for separating radially stratified tail gas flowing from the outlet of the helical coil into a lightest gas component, a heavier gas component and a heaviest gas component.

6. The fluid separation device of claim 1, wherein the raw fluid comprises waste products including oily waters and the splitter assembly providing means for separating radially stratified oily waters flowing from the outlet of the helical coil into a relatively pure water component and a contaminated oil component.

7. The fluid separation device of claim 1, wherein the raw fluid comprises waste products including contaminated oil and the splitter assembly providing means for separating radially stratified contaminated oil flowing from the outlet of the helical coil into a gas component, an oil component and a residual solids component.

8. The fluid separation device of claim 1, wherein the splitter assembly further comprises two separator vanes defining, in part, three conduits, such that the splitter assembly is operable to separate the radially stratified fluid into three components.

9. The fluid separation device of claim 8, wherein the separator vanes partially define three conduits having approximately equal cross-sectional areas.

10. The fluid separation device of claim 8, wherein the separator vanes partially define three conduits having different cross-sectional areas.

11. The fluid separation device of claim 1, wherein the splitter assembly comprises at least one movable separator vane partially defining two conduits, such that the splitter assembly is variably operable to separate the radially stratified fluid.

12. The fluid separation device of claim 11, wherein the at least one movable separator vane is manually controlled.

13. The fluid separation device of claim 11, wherein the at least one movable separator vane is automatically controlled.

14. The fluid separation device of claim 13, wherein the at least one movable separator vane is automatically controlled responsive to raw fluid transported by the feeder assembly.

15. The fluid separation device of claim 13, wherein the at least one movable separator vane is automatically controlled responsive to outlet fluid from the splitter assembly.

16. A fluid separation system for separating raw fluid into a plurality of component fluids, comprising:
    a raw fluid reservoir operable to hold a volume of raw fluid;
    a pump in fluid communication with the raw fluid reservoir, the pump operable to receive raw fluid from the raw fluid reservoir and to provide pressurized raw fluid for separation into components;
    a fluid separation device in fluid communication with the pump, the fluid separation device operable to separate the pressurized raw fluid into a plurality of components, wherein the fluid separation device comprises;
    a body having a generally cylindrical bore defined, in part, by an inner wall of the body;
    a generally solid cylindrical core having a helical channel formed in a periphery of the cylindrical core, the cylindrical core disposed in the cylindrical bore such that the inner wall of the body and the helical channel form a helical coil, wherein the helical coil has an inlet and an outlet and has a generally rectangular cross-section;
    a feeder assembly disposed in the body and in fluid communication with the inlet of the helical coil, such that the feeder assembly is operable to transport the pressurized raw fluid to the inlet of the helical coil;
    a splitter assembly disposed in the body and in fluid communication with the outlet of the helical coil, wherein the splitter assembly comprises at least one separator vane defining, in part, a plurality of conduits, such that the splitter assembly is operable to separate a radially stratified fluid flowing from the outlet of the helical coil into a plurality of components by directing each component into one of the plurality of conduits, respectively; and a plurality of component reservoirs, each component reservoir in fluid communication with one of the plurality of conduits of the splitter assembly, such that each component reservoir is operable to receive a component from a respective conduit of the splitter assembly.

17. The fluid separation system of claim 16, further comprising a pre-filter system disposed between the raw fluid reservoir and the pump, the pre-filter system in fluid communication with the raw fluid reservoir and the pump, such that the pre-filter system is operable to filter raw fluid flowing from the raw fluid reservoir prior to entering the pump.

18. The fluid separation system of claim 16, further comprising a post-filter system disposed between the pump and the fluid separation device, the post-filter system in fluid communication with the pump and the fluid separation device, such that the post-filter system is operable to filter pressurized raw fluid existing from the pump.

19. The fluid separation system of claim 16, further comprising a sensor valve disposed between the pump and the fluid separation device, the sensor valve in fluid communication with the pump and the fluid separation device, such that the sensor valve is operable to control and monitor flow of the pressurized raw fluid.

20. The fluid separation system of claim 16 further comprising the cylindrical core constructed from synthetic sapphire.

21. The fluid separation system of claim 16 further comprising the cylindrical core constructed from alumina ceramic.

22. The fluid separation system of claim 16, wherein the raw fluid comprises a raw gas product and wherein the plurality of components comprises a propane component, a butane component and a natural gas component.

23. The fluid separation system of claim 16, wherein the raw fluid comprises stratified tail gas and wherein the plurality of components comprises a lightest gas component, a heavier gas component and a heaviest gas component.

24. The fluid separation system of claim 16, wherein the raw fluid comprises oily waters from an oil field and the plurality of components comprises a pure water component and a contaminated oil component.

25. The fluid separation system of claim 16, wherein the raw fluid comprises contaminated oil and wherein the plurality of components comprises a gas component, an oil component and a residual solids component.

26. The fluid separation system of claim 16 further comprising the body constructed from synthetic sapphire.

27. The fluid separation system of claim 16 further comprising the body constructed from alumina ceramic.

* * * * *